UNITED STATES PATENT OFFICE.

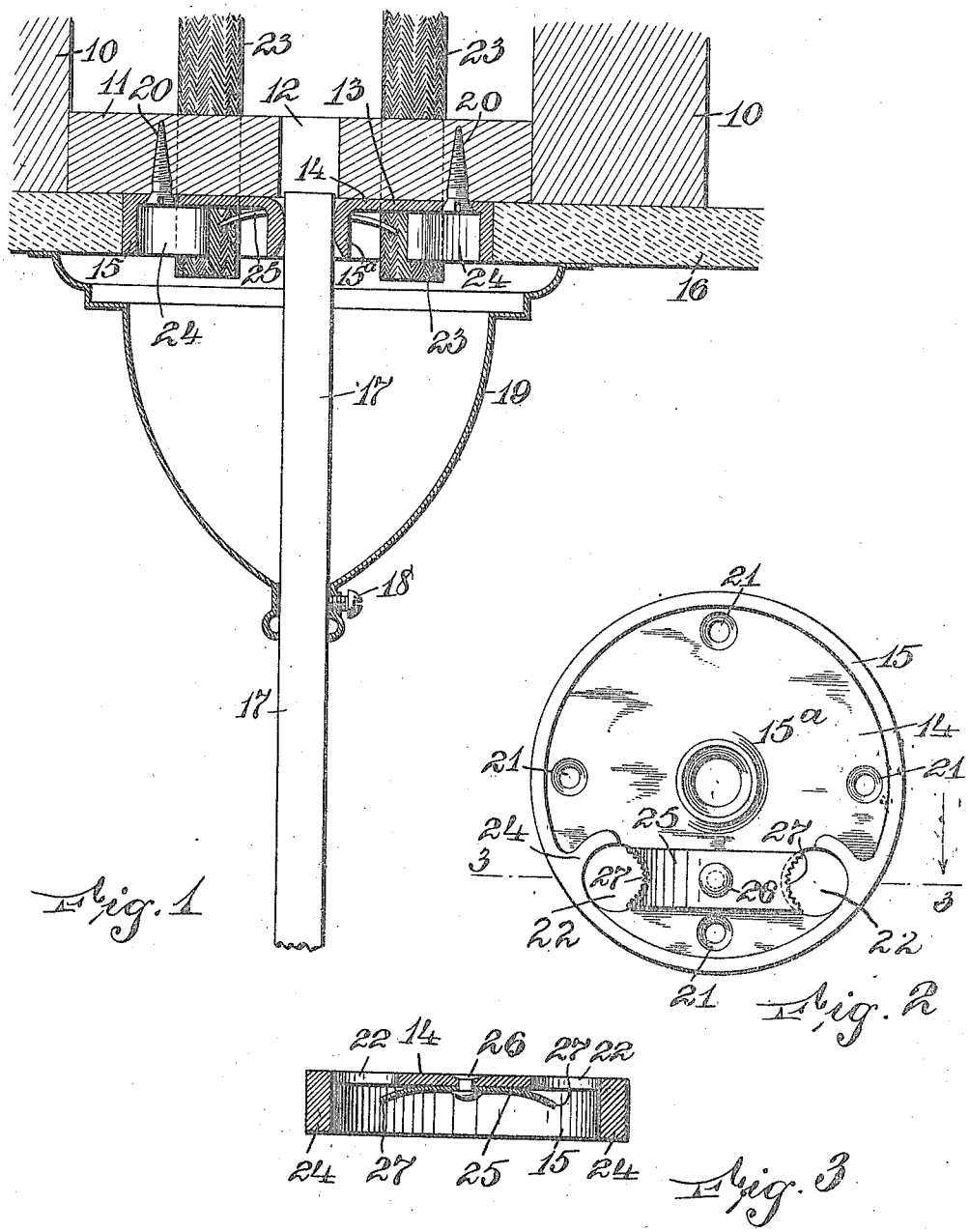

JAMES T. MELEADY, OF NEWARK, NEW JERSEY.

OUTLET-BOX.

1,190,664.   Specification of Letters Patent.   Patented July 11, 1916.

Application filed October 29, 1914. Serial No. 869,179.

*To all whom it may concern:*

Be it known that I, JAMES T. MELEADY, a citizen of the United States, and a resident of Newark, county of Essex, and State of New Jersey, have invented certain new and useful Improvements in Outlet-Boxes, of which the following is a specification.

This invention relates to an outlet box, being adapted for use in different locations, but is particularly adapted for use on lighting outlets.

The outlet box is designed to provide means for holding a suitable pipe for the lighting fixture and to also provide means for clamping flexible tubing or conduit so that a positive holding of the tubing or conduit is insured, thus minimizing chances of fire, and also saving time in installation as the retreating or backing away of the conduit is avoided.

The invention is further designed to provide an outlet box in which the clamping means is always in place, and one in which it is only necessary to force the conduit through the openings in the box, and when once shoved or pulled through, the conduits are automatically held against retreating through the outlet box.

The invention is illustrated in the accompanying drawing, in which the preferred form of outlet box is illustrated, but it is evident that slight changes can be made in the construction of the outlet box without departing from the scope of the invention.

In said drawings Figure 1 is a section showing the outlet box in place in a wall, a part of the lighting fixture being shown and the escutcheon plate or canopy being illustrated in section. Fig. 2 is a bottom view of the outlet box illustrated in Fig. 1, and Fig. 3 is a section on line 3—3 in Fig. 2.

The outlet box can be secured in place in any desired manner, but it is usually done by securing to the beams 10 of a building a short board 11 which is provided with suitable holes for the passage of the wire or conduits, and also, if necessary, with a hole 12 for the passage of a gas pipe if the fixture is to be a combination fixture. The outlet box 13 is substantially cupshaped, having a bottom plate 14 and a marginal rim 15, the outside of the marginal rim being usually flush with the outer surface of the plaster 16 of which the wall is made, or, in lieu of plaster, any other material that is designed to provide the surface of the wall.

A simple boss $15^a$ projects up from the bottom of the outlet box and provides means for the reception of a pipe 17 which can be either a pipe to hold only an electric fixture, or it can be a pipe for a combination fixture.

By means of the screw 18 is fastened a canopy 19, this canopy being secured to the pipe 17 and being adapted to hide the outlet box and the wiring to give a good finish to the fixture. The outlet box is secured in place by screws 20 which pass through the holes 21 in the bottom of the outlet box and are screwed into the board 11. The bottom of the outlet box is provided with suitable openings 22 for the reception of flexible tubing of conduit 23, this flexible conduit being slightly compressible so that it provides a surface into which small teeth or prongs can be set so as to hold the conduits in place. On the outer edges of the openings 22 are the abutments 24, the abutments being usually made integral with the marginal rim 15 and generally as high as the rim so as to give a considerable bearing surface. The abutment extends a material distance above the bottom, and this thickened bottom part and the spring, which is curved away from the bottom, hold the conduit against twisting or bending if it is a flexible conduit, since the gripping edge of the spring is opposite a point above the bottom of the box but below the top of the abutment. The operings 22 are preferably placed adjacent to the marginal rim so that a line connecting them will not pass near enough to the center of the outlet box to interfere with the installation of a clamping means that will be common to both openings 22 and hold the conduits passed through said openings in place.

The clamping means preferably comprises a spring 25 which is slightly curved, the ends being curved away from the bottom of the outlet box, the middle part of the spring, however, being fastened to the bottom of the outlet box by a suitable rivet 26 or its equivalent. The ends of the spring are curved, as at 27, these curved ends of the spring projecting beyond the edges of the openings 22 so that the ends are in the path of one side of the conduits or tubing forced from the back of the outlet box through the openings 22. When so forced, the conduits force the ends of the spring farther away from the bottom of the box and thus permit the passage of the conduits through the openings 22. If, however, the conduit has tendency to retreat through the opening, either by reason of the lack of sufficient pressure on the end of it, or through any other means, the friction of the edges of the conduit will pull the ends of the spring toward the bottom of the outlet box, and in this way have a tendency to restrict the opening and frictionally engage the conduit and prevent anything but a very slight backward movement of the conduit.

To insure the clamping or gripping of the conduit I prefer to provide the ends of the spring with teeth large enough to make a suitable gripping surface to engage the sides of the conduits, but not so deep as to penetrate materially through the outer covering of the conduit.

There is no manual manipulation of the clamping means necessary in the insertion of the conduits through the openings 22, such manual operation only being necessary when the conduits are intentionally released. In the drawing, the particular wiring comes through the conduits, and the manner in which these pass into the pipe 17 is not illustrated, the drawing showing only the conduits 23, which are of the flexible type and are adapted to conduct electric wires behind the walls of buildings to protect the wires from contact with the parts of the building through which they pass.

The device is cheaply constructed, and while it insures the holding of the conduit, it does not materially increase the cost of installation.

Having thus described my invention, I claim:

1. An outlet box comprising a body portion having an opening in the bottom, the bottom at one side of the opening being materially thickened to form an abutment, and a curved spring secured to the bottom and with its end curved away from said bottom and extending normally within the edge of the opening, the abutment and the end of the spring being opposite each other.

2. An outlet box comprising a body portion having an opening in the bottom, the bottom at one side of the opening being materially thickened to form an abutment, and a curved spring secured to the bottom and with its end curved away from said bottom and extending normally within the edge of the opening, the spring extending from the side opposite the abutment and toward the abutment, the end of the spring being opposite a point above the bottom and below the top of the abutment.

3. An outlet box comprising a cup-shaped body portion, the body portion having a substantially flat bottom and a marginal rim of material height, the bottom having conduit openings adjacent to the rim, the rim being extended partly around said openings to form abutments of material height, and a slightly curved spring secured at its middle part against the bottom of the body portion between the openings in the bottom, the ends of the spring projecting slightly within the lines of the edges of the openings, said ends of the springs being opposite said abutments between the top and bottom edges thereof.

In testimony that I claim the foregoing, I have hereunto set my hand, this 28th day of October, 1914.

JAMES T. MELEADY.

Witnesses:
M. A. JOHNSON,
H. TRAUTVETTER.